United States Patent
Yu et al.

(10) Patent No.: US 11,467,641 B2
(45) Date of Patent: Oct. 11, 2022

(54) SYSTEM AND METHOD FOR DYNAMICALLY IDENTIFYING A POWER ADAPTOR POWER RATING BASED ON OPERATING CONDITIONS

(71) Applicant: Dell Products, LP, Round Rock, TX (US)

(72) Inventors: Wei-Cheng Yu, New Taipei (TW); Tsung-Cheng Liao, Taoyuan (TW); Tun-Chieh Liang, Taipei (TW); Wen-Yung Chang, Jhong Li (TW); Chi-Che Wu, Taipei (TW)

(73) Assignee: Dell Products, LP, Round Rock, TX (US)

( * ) Notice: Subject to any disclaimer, the term of this patent is extended or adjusted under 35 U.S.C. 154(b) by 61 days.

(21) Appl. No.: 16/248,318

(22) Filed: Jan. 15, 2019

(65) Prior Publication Data
US 2020/0225721 A1 Jul. 16, 2020

(51) Int. Cl.
*G06F 1/26* (2006.01)

(52) U.S. Cl.
CPC ..................... *G06F 1/26* (2013.01)

(58) Field of Classification Search
CPC .......... G06F 1/26; G06F 11/3058; G06F 1/28; G06F 1/30; G06F 1/206; G06F 1/3203; G06F 9/4893; G06F 9/5094
See application file for complete search history.

(56) References Cited

U.S. PATENT DOCUMENTS

| | | | | |
|---|---|---|---|---|
| 5,905,645 A | * | 5/1999 | Cross | H02H 5/044 363/65 |
| 6,498,957 B1 | * | 12/2002 | Umetsu | G06F 1/26 320/117 |
| 8,645,720 B2 | | 2/2014 | Weng | |
| 2009/0193156 A1 | * | 7/2009 | Suematsu | G06F 1/266 710/14 |
| 2011/0179291 A1 | * | 7/2011 | Weng | G06F 1/26 713/300 |
| 2012/0117398 A1 | * | 5/2012 | Lambert | H02J 1/14 713/320 |
| 2014/0028377 A1 | * | 1/2014 | Rosik | G05F 3/02 327/513 |

(Continued)

*Primary Examiner* — Jaweed A Abbaszadeh
*Assistant Examiner* — Hyun Soo Kim
(74) *Attorney, Agent, or Firm* — Prol Intellectual Property Law, PLLC; H. Kenneth Prol

(57) ABSTRACT

A power adaptor system may comprise a power source supplying input voltage according to a dynamic power rating to an operably connected host information handling system, a power source identification (PSID) module of the power adaptor receiving an adjustable setting voltage from the power source via a setting voltage port of the PSID module, and a controller of the PSID module executing code instructions to select the dynamic power rating for the power source based on a measurement of the adjustable setting voltage indicating an operating condition of the power adaptor or based on an indication of an operating condition the operably connected host information handling system, wherein the dynamic power rating is one of a plurality of dynamic power ratings in including an adjustable range of power levels at each dynamic power rating at which the power source is capable of operating.

20 Claims, 6 Drawing Sheets

(56) References Cited

U.S. PATENT DOCUMENTS

| | | | |
|---|---|---|---|
| 2015/0346792 A1* | 12/2015 | Rathi | G05F 1/625 |
| | | | 713/310 |
| 2016/0266635 A1* | 9/2016 | Shabbir | G06F 1/26 |
| 2017/0108910 A1* | 4/2017 | Goh | G06F 13/385 |
| 2017/0269679 A1* | 9/2017 | Atkinson | G05F 5/00 |
| 2017/0374710 A1* | 12/2017 | Heubach | H05B 1/0252 |
| 2018/0188800 A1* | 7/2018 | Alon | G06F 1/3206 |
| 2018/0345812 A1* | 12/2018 | Chaturvedi | G01R 31/3647 |
| 2019/0138074 A1* | 5/2019 | Brooks | G06F 1/305 |

* cited by examiner

FIG. 3

Dynamic Power Supply Identification Information Table 300

| Digital Voltage Volumes 302 | Dynamic Power Ratings 304 | Adjustable Power Levels 306 |
|---|---|---|
| 0 | Fault | Fault |
| 1 | 330W | 330W |
| 2 | 240W | 330W |
| 3 | 180W | 240W |
| 4 | 180W | 240W |
| 5 | 130W | 180W |
| 6 | 130W | 180W |
| 7 | 90W | 130W |
| 8 | 90W | 130W |
| 9 | 65W | 90W |
| 10 | 65W | 90W |
| 11 | 45W | 65W |
| 12 | 45W | 65W |
| 13 | 30W | 45W |
| 14 | | 45W |
| 15 | | 30W |

First PSID data record 236

Second PSID data record 238

Dynamic Power Rating 312

Peak Power State 314

Default Power State 316

… (1) …

SYSTEM AND METHOD FOR DYNAMICALLY IDENTIFYING A POWER ADAPTOR POWER RATING BASED ON OPERATING CONDITIONS

FIELD OF THE DISCLOSURE

The present disclosure generally relates to a power adaptor detection system. The present disclosure more specifically relates to dynamically identifying a power rating for a power adaptor based on operating conditions of the power adaptor and/or an operably connected host information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a power adaptor identification system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a graphical diagram illustrating a dynamic power supply identification information table according to an embodiment of the present disclosure;

The use of the same reference symbols in different drawings may indicate similar or identical items.

DETAILED DESCRIPTION OF THE DRAWINGS

Figure 1:
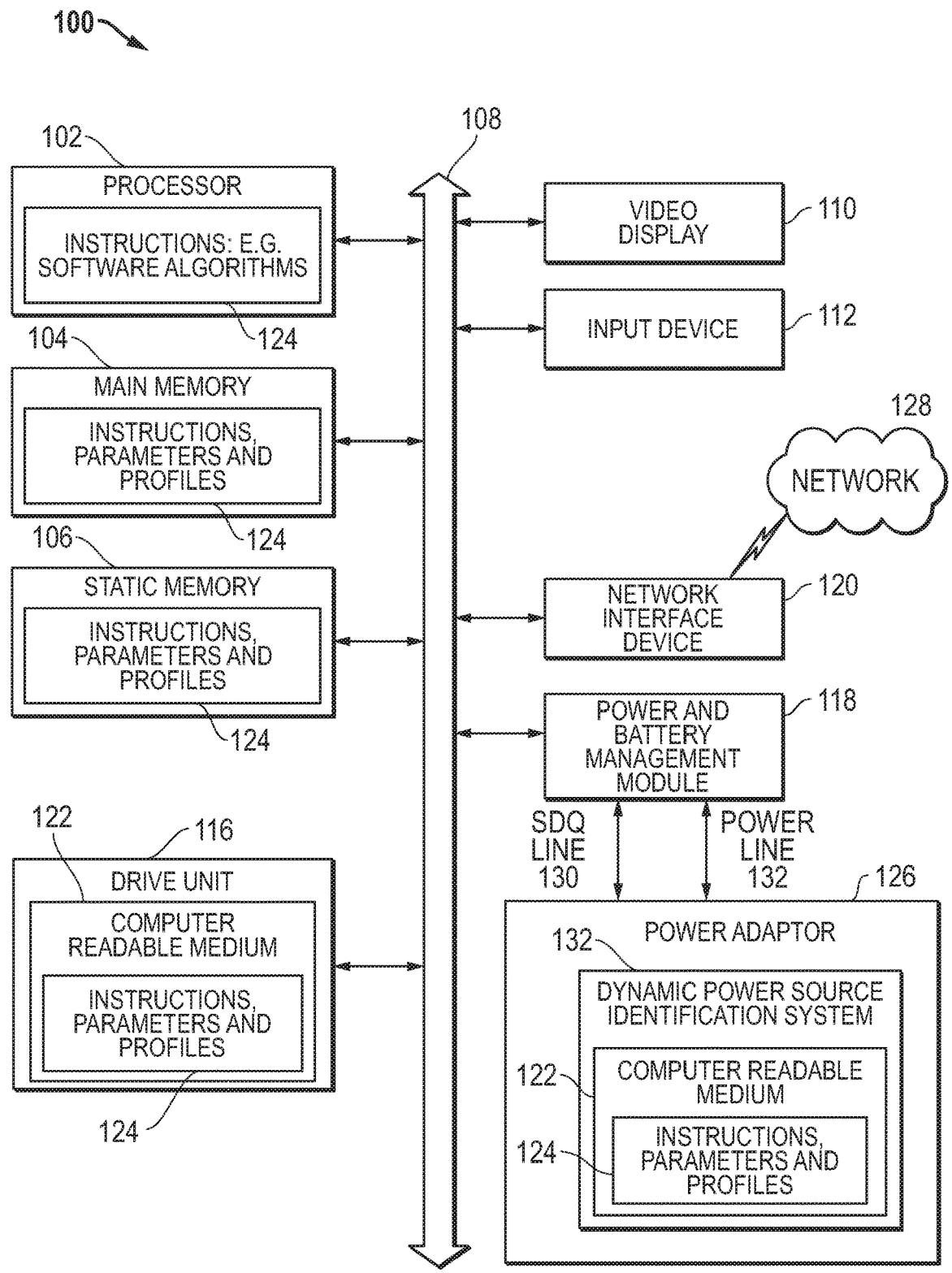
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Power adaptors operate to convert alternating current to direct current for delivery to a connected information handling system. Each power adaptor may operate according to different settings, such as a power rating, peak voltage, manufacturer, or a variety of other attributes. An information handling system may configure its power consumption and power policies more effectively by considering the settings for the power adaptor from which it receives direct current. Some information handling systems user power adaptor identification (PSID) signals to communicate the various settings of a power adaptor currently providing power.

Power adaptors may incorporate a power source identification circuit or module that operably connects the power source within the power adaptor to the host information handling system. Such a power source identification module (PSID module) may be incorporated into a plurality of different types of power adaptors, each of which may deliver power according to different specifications (e.g. differing direct current voltage levels). Such a PSID module may store a plurality of data records that can be used to determine which of the power adaptors the PSID module is operably connecting to the host information handling system. The PSID module in some prior art systems may measure the voltage received by the PSID module from the power adaptor power source, and locate one of the plurality of data records stored in the PSID module that is associated with the measured received voltage in order to identify the power adaptor. In such prior art systems, the PSID module may deliver information stored within the identified data record to the host information handling system for use by the host in setting its power policies. Power may be delivered to the host information handling system in such prior art systems at a default, static voltage preset upon manufacture of the power adaptor. Such prior art systems do not allow for dynamic adjustment of the voltage delivered to the host information handling system based on operating conditions of the power adaptor or the host information handling system.

Embodiments of the present disclosure address this issue by dynamically updating information transmitted to the host information handling system describing the power rating of the power adaptor, based on operating conditions of the power adaptor, or on instructions from the host information handling system. For example, each PSID data record in embodiments of the present disclosure associating the voltage measured by an analog to digital converter (ADC) with a power rating of the operably connected power adaptor may supply a plurality of power ratings for the same power adaptor, rather than a static, singular power rating. A dynamic power rating may be included in PSID data records, indicating a default power rating for the power adaptor, as well as a dynamic power rating that identifies the peak power capabilities of the power adaptor. In embodiments described herein, the dynamic PSID system may instruct the host information handling system to receive power from the operably connected power adaptor at peak power in the absence of indications the default power rating should be used.

Further, the voltage measured by the ADC, and used to identify the power adaptor supplying voltage to the PSID module, may vary in embodiments of the present disclosure, based on operating conditions of the power adaptor. A series of thermal sensors, switches, and resistors in embodiments described herein may effectively modify the voltage measured by the ADC when the temperature of one or more internal components of the power adaptor reach critical levels. When such a critical temperature threshold is reached, the power adaptor may automatically decrease its power output in order to also decrease its internal temperatures. Such modified set voltage may cause the PSID module to associate the power adaptor with a default power rating, or another power rating below peak power resulting in the power adaptor decreasing its power output. By transmitting an updated power rating with this lower value to the host information handling system when the internal temperature of the power adaptor reaches critical levels, the dynamic PSID system in embodiments allows the host information handling system to reconfigure its power policies in anticipation of lower power received from the adaptor.

Also, the dynamic PSID system in embodiments of the present disclosure may adaptively adjust the power rating delivered to the host information handling system based on one or more operating conditions of the host information handling system. For example, some host information handling systems may be capable of receiving peak power from the power adaptor at turn-on, while others may not. At turn-on, a PSID controller in embodiments of the present disclosure may transmit a reset instruction to the host information handling system. Hosts that are capable of supporting peak power at turn-on may respond to this instruction with a reply message, while hosts that are not so capable may fail to respond. In embodiments of the present disclosure, when the PSID data record associated with the voltage measured by the ADC includes two or more power ratings (e.g. default power rating and dynamic power rating), the PSID controller may determine which power rating to transmit to the host based on the response from the host, or lack thereof. In such embodiments, if no response is received from the host information handling system following transmission of the reset instruction, the PSID controller may transmit the default power rating, which may be below peak power, to the host information handling system. In contrast, if a response to the reset instruction is received from the host information handling system, the PSID controller may transmit the dynamic power rating supporting peak power to the host information handling system at turn-on.

In another aspect of embodiments of the present disclosure, the PSID controller may dynamically adjust the power ratings transmitted to the host, following turn-on, based on operating conditions of the host information handling system. For example, host information handling systems that do not support peak power at turn-on, the PSID controller may initially transmit a default power rating below peak power at turn-on, and then transmit a dynamic power rating supporting peak power shortly thereafter. In embodiments in which the host information handling system has been receiving peak power for a period of time meeting a capped time limit, or in which the host information handling system needs to decrease the voltage received for some other reason (e.g. shift in power policies, increase in temperature of critical components, etc.), the host information handling system may transmit an override instruction to the PSID controller. In response to such an override, the PSID controller in embodiments described herein may transmit a power rating below peak power (e.g. default power rating) to the host information handling system in anticipation of the host information handling system throttling the voltage received.

Embodiments of the present disclosure may also control operation of a light emitting diode (LED) of the power adaptor based on potential fault conditions. Fault conditions may occur in embodiments when the PSID module encounters an over voltage or under voltage event, or when the voltage measured and converted by the ADC does not match any of the PSID data records providing power ratings. During such fault conditions, a fault detection circuit in embodiments may shunt the LED to ground, causing the LED to stop emitting light. This may indicate to the user that the power adaptor is malfunctioning during a fault condition, rather than the host information handling system. In such a way, embodiments of the present disclosure may avoid unnecessary returns or reformatting of correctly operating host information handling systems and related costs by identifying that the fault lies with the power adaptor.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100, and/or on a power adaptor 126 operably connected to information handling system 100.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, computer readable medium 122 storing instructions 124 of the dynamic PSID system 132, and drive unit 116 (volatile (e.g. random-access memory, etc.), non-volatile (read-only memory, flash memory etc.) or any combination thereof). The information handling system 100 can also include one or more buses 108 operable to transmit communications between the various hardware components such as any combination of various input and output (I/O) devices. Additionally, the information handling system 100 may include an input device 112, such as a keyboard, and/or a cursor control device, such as a mouse, touchpad, or gesture or touch screen input. The information handling system 100 can also include a disk drive unit 116.

The information handling system 100 may be operably connected to a power adaptor 126 via one or more SDQ lines 130, and via one or more power lines 132. For example, the power adaptor 126 may be a barrel-type adaptor with power lines 132 and SDQ line 130 coaxially situated in one cable. The power adaptor 126 may supply direct current power to the information handling system 100 via a power and battery management module 118 of the information handling system 100. The power and battery management module 118 may receive power supply data, capacity and settings from the power adaptor 126 via the SDQ line 130. In some embodiments, the power and battery management module 118 may monitor (i) power consumption and workload data across the IHS 100 as well as (ii) the amount of available power provided by the power adaptor 126. Further, the power and battery management module 118 may be capable of capping the amount of power received from the power adaptor 126 based on one or more operating conditions of the information handling system 100. For example, in an embodiment, the power and battery management module 118 receiving peak power from the power adaptor 126 via power line 132 may determine a need to decrease the rating of the power received from the adaptor 126 to a lower, default rating. In such an embodiment, the power and battery management module 118 may transmit an override signal to the power adaptor 126 via SDQ line 130.

The power adaptor 126 in an embodiment may include a dynamic PSID system 132. The dynamic PSID system 132 may be stored in computer readable medium 122 and may also contain space for data storage. The dynamic PSID system 132 may perform tasks related to optimizing the power rating of the power adaptor 126 based on one or more operating conditions of the power adaptor 126 and/or the information handling system 100.

The network interface device shown as wireless adaptor 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 120 may also provide connectivity via Bluetooth to a nearby information handling system, such as a desktop or laptop information handling system, or to a tablet or mobile device. The wireless adaptor 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The power adaptor 126 can include a set of instructions 124 that can be executed as firmware on a controller, for example, to cause the computer system to perform any one or more of the methods or computer based functions disclosed herein. In other examples, instructions 124 may execute a dynamic PSID system 132 as part hardware and part software, software agents, or via other aspects or components. Various firmware or software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
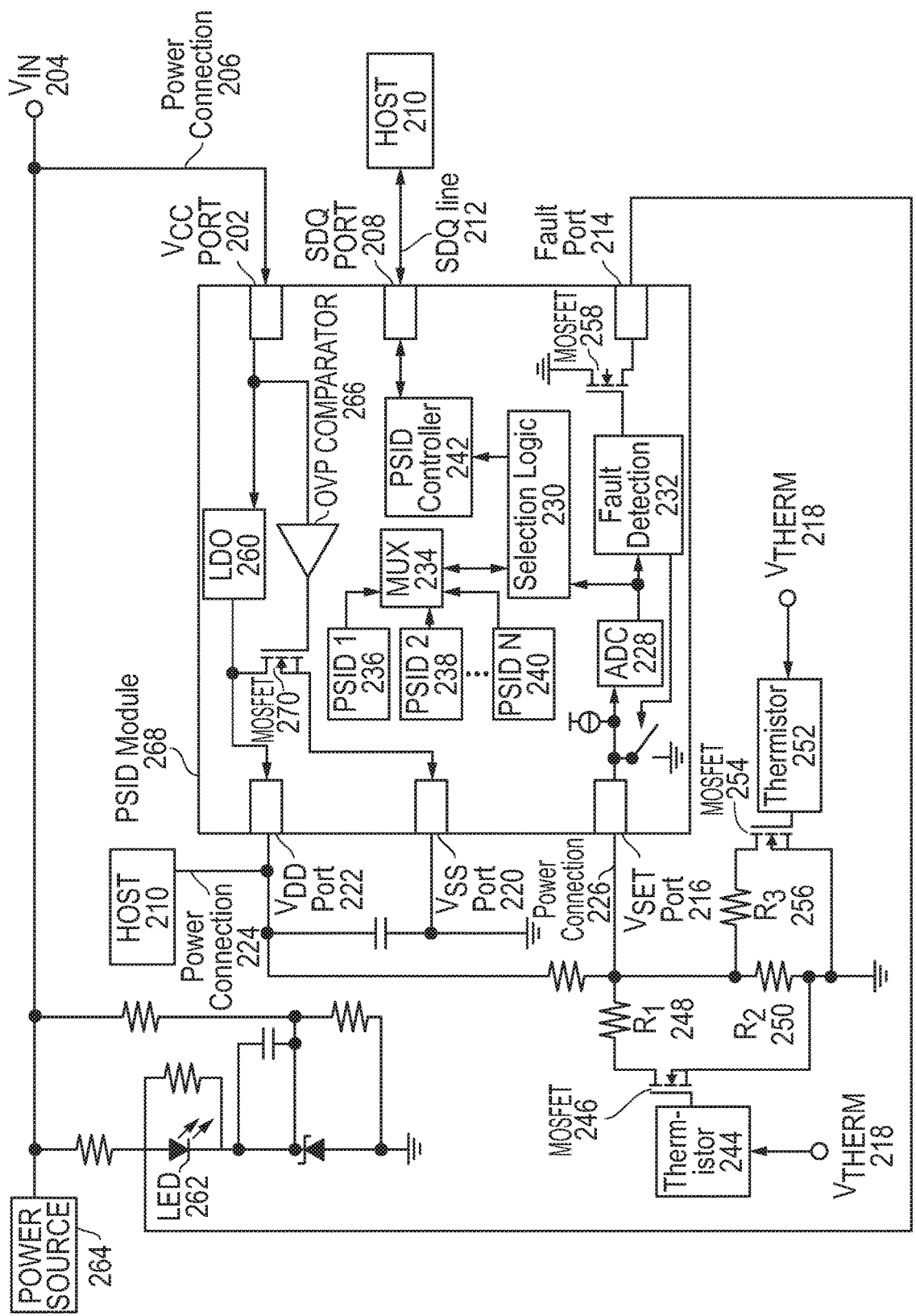
FIG. 2 is a circuit diagram illustrating a power source identification module according to an embodiment of the present disclosure.

FIG. 2 is a circuit diagram illustrating a power source identification module capable of adaptively optimizing the power connection between a power adaptor and a host information handling system according to an embodiment of the present disclosure. A power source identification module 268 in an embodiment may incorporate several ports for communication or power delivery to other devices or modules. For example, the PSID module 268 in an embodiment may include a $V_{CC}$ Port 202, which may receive an input voltage $V_{IN}$ 204 from the power source of the power adaptor via a power connection 206. The PSID module 268 may also include an SDQ port 208 in an example embodiment, which may transmit and receive information to an operably connected host information handling system 210 via an SDQ line 212. As another example, the PSID module 268 may also include a fault port 214, which may be linked with under voltage and over voltage protection in an embodiment. In yet another example, the PSID module 268 may incorporate a $V_{DD}$ port 222 which may deliver power received from the power source of the adaptor to the host information handling system 210, via power connection 224. The PSID module 268 in an embodiment may also include a $V_{SS}$ Port 220, which may connect portions of the PSID module 268 to ground, as necessary, including shunting power via power MOSFET 270 so that no power is delivered to the host information handling system 210.

A $V_{SET}$ port 216 in an embodiment may also be incorporated within the PSID module 268, and may operate to receive a measurable setting voltage $V_{SET}$, via set power connection 226. Power connection 226 may include one or more parallel resistors of a modifiable voltage divider that may operate according to a plurality of combinations in order to effectively vary the setting voltage $V_{SET}$ measured at $V_{SET}$ port 216. For example, the $V_{SET}$ port 216 in an embodiment may be operably attached to a first resistor 248, a second resistor 250, and a third resistor 256. A constant current supplied by PSID module 268 may flow through the second resistor 250 at all times, and may additionally flow through neither, one, or both of the first 248 and third 256 resistors, depending on operating conditions of one or more components of the power adaptor, such as thermally controlled MOSFETs 246 and 254. Thus, a setting voltage $V_{SET}$ measured at $V_{SET}$ port 216 in an embodiment may be equivalent to the voltage determined by the PSID module 268 divided by any of several combined resistances of whichever of the parallel first 248, second 250, or third 256 resistors are receiving current.

The analog to digital converter (ADC) 228 may measure the setting voltage $V_{SET}$ at $V_{SET}$ port 216. Each power adaptor module may be capable of delivering a different setting voltage $V_{SET}$, which may be known upon manufacture of the PSID module 268. ADC 228 may convert the voltage measured at $V_{SET}$ port 216 to a digital voltage value. For example, if the measured voltage is between two whole numbers, the ADC 228 may convert the measured value to a digital whole number by rounding up to the nearest whole number value or rounding down to the nearest whole number value. Because the digital voltage value is determined based on the measured voltage, and each power adaptor model may generate a separate, known setting voltage $V_{SET}$, each power adaptor model may be associated with a different digital voltage value, which may also be known at the time of manufacture of the PSID module 268. The ADC 228 in such an embodiment may then transmit the digital voltage value to a selection logic circuit 230 and a fault detection circuit 232.

The selection logic circuit 230 in an embodiment may access a plurality of PSID data records via a multiplexing circuit 234. A plurality of PSID data records (e.g. a first PSID 236, a second PSID 238, down to an Nth value PSID 240) may be stored in a memory (e.g. read-only memory (ROM)) of the PSID module 268. Each of the PSID data records 236-240 in such an embodiment may be associated with a preset digital voltage value, known to also be associated with an identification of a particular model of power adaptor. Each PSID data record 236-240 may also identify one or more power ratings for the identified particular model of the power adaptor operating at a particular voltage. The selection logic circuit 230 may select one of the PSID data records 236-240 associated with the digital voltage value generated by the ADC 228, and may forward that PSID data record to a PSID microcontroller 242 of the PSID module 268. The microcontroller 242 may then forward the power rating information within the PSID data record to the host information handling system 210 via the SDQ port 208 and SDQ line 212, for configuration of power policies within the host information handling system 210. The host 210 may also transmit communication to the PSID controller 242 via SDQ line 212. For example, the PSID controller 242 may transmit a power reset instruction, or an interrupt signal to the host 210. If the host 210 is capable of receiving peak power at startup in an embodiment, the host 210 will respond to an initial reset instruction transmitted by the PSID controller 242 at startup with a reply, indicating its presence. If the host 210 is not capable of receiving peak power at startup in an embodiment, the host 210 will not respond to such an initial reset instruction.

Each of the PSID data records 236-240 in an embodiment may associate the PSID for a given power adaptor model with one or more digital voltage values, power ratings, and a plurality of power operating levels for each power rating (e.g. default, and dynamic). Prior art systems do not allow for a plurality of power levels to be associated with a single power rating for a power adaptor model, and instead only provide a default power rating below the peak power level. In contrast, embodiments of the present disclosure provide the default power level, which does not support peak power capabilities, as well as one or more additional power levels for power ratings identified for an adaptor. For example, each PSID data record 236-240 in an embodiment may associate the digital voltage value for an operably connected power adaptor model with both default power levels and dynamic power levels supporting peak power capabilities. Some PSIDs in embodiments of the present disclosure may be associated with more than two power levels (e.g. default and dynamic), for a power rating including the default and dynamic power ratings, or a power level below the default power level.

As described herein, by measuring and converting the adjustable set voltage at the power connection 226 to a digital voltage value and locating a PSID data record identifying that voltage value, the selection logic 230 may effectively identify the power rating capabilities of the operably connected power adaptor. These power ratings may include a peak-power rating indicating the highest voltage at which the operably connected power adaptor may generate power. A power adaptor capable of generating power at peak levels in an embodiment may be designed to operate at peak power for prescribed periods of time or under specific operating conditions of the power adaptor in order to avoid damaging internal components of the adaptor.

For example, as the power adaptor generates higher voltages, one or more internal components of the adaptor may increase in temperature. In order to avoid damage to those components or nearby components, embodiments of the present disclosure may cause the power adaptor to decrease the voltage delivered via power connection 226 when internal temperatures within the power adaptor increase to preset threshold values. For example, as described herein, the second resistor 250 may hold $V_{SET}$ which may be based on output voltage $V_{DD}$ at times, and current may flow through one or both of the thermally controlled first 248 and third 256 resistors, depending on operating conditions of one or more components of the power adaptor, adjusting $V_{SET}$. The power adaptor in an embodiment may include one or more thermistors capable of measuring internal temperature of the power adaptor at temperature-critical locations. As an example, the power adaptor may include a thermistor 244 which may receive voltage $V_{THERM}$ 218, and may act as a resistor whose resistance decreases as the temperature of thermistor 244 increases, or some other thermal control to state of MOSFET 246.

Thermistor 244 and thermal control may be operably connected to a gate of MOSFET switch 246 which may route current through only the second resistor 250, and not through the first resistor 248, when the MOSFET is in an open position or an off state. When placed in such a starting position, the voltage measured by ADC 228 may be equivalent to a first $V_{SET}$ value of the adjustable setting voltage received at $V_{SET}$ port 216. For example, ADC 228 may measure a voltage of 9.989 V at $V_{SET}$ port 216 across the second resistor 250 in an example embodiment, and may convert that measured voltage to a digital voltage value of 10 V. The digital voltage value converted from the measured voltage across only the second resistor 250 in such an example embodiment may be associated in one of the PSID data records 236-240 with a peak voltage capability of 90 W for the specific model of power adaptor.

As the temperature of thermistor 244 increases, and resistance of thermistor 244 decreases, or other thermistor control may actuate the gate of MOSFET 246 upon reading a threshold temperature value. This threshold temperature value may be equivalent to a maximum temperature rating of one or more components within the power adaptor in an embodiment. Upon reaching such a temperature threshold value, it may be desirable to decrease the power supplied by the power adaptor below the peak voltage in order to decrease the internal temperature of the power adaptor. Thus, once the gate of MOSFET 246 is actuated when 244 reaches the threshold voltage value, MOSFET 246 may close and divert the current to flow through both the first resistor 248 and the second resistor 250, implementing a voltage divider. The resultant voltage measured across both the parallel first and second resistors 248 and 250, respectively, may be different than the voltage measured across only the second resistor 250, depending upon the voltage divider. For example, the ADC 228 may measure an adjustable setting voltage across the first and second resistors 248 and 250 at $V_{SET}$ port 216 of 10.88 V. The ADC 228 in such an embodiment may convert the voltage measured across the first and second resistors 248 and 250 together (e.g. in parallel) as 11 V, which may be higher than the digital voltage value generated by the ADC 228 when the MOSFET 246 only allowed current to flow through the second resistor 250. Because a single power adaptor model may be capable of two operating power levels as characterized by the adjustable setting voltage values, both of the converted digital voltage values 10V and 11V may be associated with the same PSID or the same power adaptor model dynamic power rating but different power levels.

MOSFET 246 may have a preset thermally controlled gate in an embodiment to divert current in such a way when a thermistor 244 reaches the maximum temperature rating of one or more components placed nearby the thermistor 244. For example, the Negative Temperature Coefficient (NTC) data sheet associated with thermistor 244 may identify the resistance provided at a maximum temperature rating. The gate for MOSFET 246 may then be set to receive a gate voltage from the resistance thermistor 244 at that maximum temperature rating. In such a way, the combination of thermistor 244, MOSFET 246, and the first and second resistors 248 and 250 may adjust the setting voltage at $V_{SET}$ 216 and cause the ADC 228 to generate a modified digital voltage value. In an embodiment, the ADC may generate a lower digital voltage value when the power adaptor is operating according to peak power level within a dynamic power rating, and generate a higher digital voltage value when the power adaptor should be operating at the default power level below peak power.

In some embodiments, more than one thermistor and more than one MOSFET may be used in order to allow the ADC 228 to measure additional adjusted setting voltage values at $V_{SET}$ 216 that are also associated with the same power adaptor model and dynamic power rating. For example, the power adaptor in an embodiment may include a second thermistor 252, a MOSFET 254, and a third resistor 256. When operating at peak voltage, and when the temperature of thermistor 252 is below a threshold value, MOSFET 254 may operate in an open position to implicate the second resistor 250. As thermistor 252 reaches a threshold temperature value, it may decrease its resistivity, increasing a gate voltage at MOSFET 254, and causing MOSFET 254 to allow current to flow through the third resistor 256 as well, modifying the voltage at $V_{SET}$ port 216 according to a newly activated voltage divider with $R_3$ 256 and $R_2$ 250 in parallel.

Thus, in an embodiment, the voltage dropped across both the second and third resistors 250 and 256 may be higher than the voltage dropped across only the second resistor 250 alone indicating at $V_{SET}$ a need for a lower voltage level within the adaptor dynamic power rating. Similarly, if MOSFET 246 is allowing current to flow through both the first and second resistors 248 and 250, then the voltage at $V_{SET}$ port 216 is voltage dropped across the first 248, second 250, and third 256 resistors, which may be even higher than the voltage dropped across the first 248 and second 250 resistors in combination. In such an embodiment, this even higher voltage than that dropped across the second 250 and third 256 resistors in combination may provide for yet another power level within the dynamic power range. In such a way, the ADC 228 in an embodiment could measure at least three different voltages, and convert those measured voltage to three different digital voltage values in the example embodiment. Each of those three digital voltage values in such an embodiment may be associated with a single power adaptor model and single power rating, but with three separate power levels that are dynamically adjustable. In such an embodiment, the PSID controller 242 may be capable of dynamically identifying three separate dynamic power levels for the same power adaptor to the host 210. Still other embodiments could include still more thermistors, MOSFETs, and resistors in a similar pattern to increase the number of default power levels for a dynamic power rating that may be associated with a single power adaptor model identified by the PSID module 268.

Embodiments of the present disclosure also allow for dynamic adjustment of the power levels transmitted to the host 210 based on operating conditions of host information handling system. For example, in an embodiment described with reference to FIG. 2, if the ADC has generated a digital voltage value associated with multiple dynamic power levels, the PSID controller 242 may determine which of the multiple dynamic power levels to transmit to the host information handling system 210. The PSID controller 242 in an embodiment may transmit the peak power level when the host 210 indicates it is capable of receiving peak power, and in the absence of override commands from the host 210.

For example, upon startup, the PSID controller 242 may transmit a reset instruction to the host 210 via SDQ line 212. If the host is capable of receiving peak power at startup, it may respond by transmitting a reply indicator via SDQ line 212. If the host is not capable of receiving peak power at startup, it may not respond. In an embodiment in which the PSID controller 242 receives a reply at startup, the PSID controller 242 may then transmit the peak power level to the host 210. In an embodiment in which the PSID controller 242 does not receive a reply at startup, the PSID controller 242 may transmit the default power level to the host 210, despite the fact that a peak power level is available. This may be the case because the PSID controller 242 has identified that the host 210 is not capable of receiving the peak power identified in the dynamic power rating.

Similarly, the host 210 in an embodiment may transmit an override instruction to the PSID controller 242, prompting the PSID controller 242 to shift from the peak power level to the default power level, where both the peak power level and default power level are within the same dynamic power level range. For example, the host information handling system 210 in an embodiment may determine it has been receiving power at the peak power level identified in the second PSID data record 238 for the operably connected power adaptor for a time duration equivalent to a preset time threshold value. In such an embodiment, the host 210 may then transmit an override signal to the PSID controller 242 via SDQ line 212. The PSID controller 242 may respond to such an override signal by transmitting an interrupt signal to the host 210, followed by the default power level from the second PSID data record 238. The host 210 may then limit the power received to the default power level.

Embodiments of the present disclosure may also control operation of a light emitting diode (LED) of the power adaptor based on potential fault conditions. During normal operating conditions (not including fault conditions), the PSID module 268 may receive voltage $V_{IN}$ 204 from the power adaptor via $V_{CC}$ port 202, and channel the incoming power to a low dropout regulator (LDO) 260. The LDO 260 in an embodiment may be a linear voltage regulator that operates to regulate the output voltage $V_{DD}$ even when the supply voltage $V_{IN}$ 204 is very close to the output voltage $V_{DD}$. In other embodiments, the LDO 260 may be a switching regulator. MOSFET 268 may operate in a starting position to channel all power from the LDO 260 to $V_{DD}$ port 222. $V_{DD}$ port 222 may transmit the power to the host 210 via power connection 224. Fault conditions may occur when the PSID module 268 encounters an over voltage event in which the voltage $V_{IN}$ 204 received via the $V_{CC}$ port 202 and measured via the over voltage protection comparator (OVP) 266 spikes above a threshold over voltage value. In such an event, the OVP 266 may cause MOSFET 270 to divert power to $V_{SS}$ port 220, which may effectively act as ground, rather than delivering power to the host 210. This will also create a fault condition at $V_{SET}$ port 216 via power connection 226. Another fault condition may occur when the voltage $V_{IN}$ 204 received via the $V_{CC}$ port 202 and measured via OVP 266 falls below a threshold under voltage value, otherwise known as an under voltage event. The under voltage condition may also be detected at $V_{SET}$ port 216.

Still another fault condition may occur when ADC 228 converts a measured setting voltage at $V_{SET}$ port 216 to a digital voltage value, but the converted digital voltage value does not match any of the PSID data records 236-240 stored in ROM. In yet another scenario, during an over voltage event, the OVP 266 may compare the voltage at $V_{CC}$ port 202 and the voltage at SDQ port 208. By performing such a comparison, the OVP 266 may detect when SDQ line has been shorted to the power line between the host 210 and the power source 264. Such a scenario may occur, for example, in an embodiment in which the SDQ line and power line are coaxially located within the same barrel-type power adaptor cord, and the cord has been damaged. When such a short has been detected in such an embodiment, the OVP 266 may cause a switch located between the ADC 228 and the $V_{SET}$ port 216 to close, sending power received via power connection 226 to ground. In such an example embodiment, ADC 228 may read a measured voltage of zero, and generate a digital voltage value of zero. In an embodiment in which the fault detection circuit 232 determines the digital voltage value does not match a PSID data record (e.g. because it is too high or zero), the fault detection circuit 232 may detect a fault condition, and may supply a gate voltage to the gate of MOSFET 258, closing MOSFET 258 and shunting voltage at the fault port 214 to ground.

The fault port 214 may be operably connected to an LED 262 of the power adaptor, visible by a user. The LED 262 may receive power via the power source 264 of the power adaptor, and may operate in normal conditions to emit light when the power adaptor is receiving AC current from a wall outlet and no fault condition exists. As described herein, during an over voltage event in the prior art, such an LED may continue to emit light, even after the over voltage protection circuit has diverted all voltage incoming from the power adaptor power source to ground. This discrepancy allowed users to believe the power adaptor was functioning properly, and the host 210 was malfunctioning by not turning on, when in fact, the power adaptor was malfunctioning and not allowing power to reach the host information handling system. Embodiments of the present disclosure address this issue by causing the LED 262 to stop emitting light during an over voltage event.

The fault detection circuit 232 in an embodiment may operate to provide a gate voltage to turn on MOSFET 258 when the fault detection circuit 232 detects a fault condition. In such an embodiment, MOSFET 258 may effectively connect fault port 214 to ground. Fault port 214, in an embodiment, may also be operably connected to the power line between the power source 264 and LED 262. By connecting fault port 214 to ground, the MOSFET 258 then shunts the power being transmitted from power source 264 to LED 262. The LED 262 ceases to receive current. In such a way, the fault detection circuit 232 may cause the LED 262 to stop emitting light when a fault condition is detected, indicating to the user that the power adaptor is malfunctioning to cause the host 210 to fail to turn on.

FIG. 3 is a graphical diagram illustrating a dynamic power supply identification information table describing power ratings for a plurality of power adaptor identification values according to an embodiment of the present disclosure. A dynamic power supply identification information table 300 in an embodiment may identify dynamic power ratings and adjustable power levels in those dynamic power ratings for a plurality of power source identifications (PSIDs) of various power adaptors. For example, column 302 of the dynamic power supply identification information table 300 may provide a plurality of known power source identification values. A digital voltage value converted by an ADC at $V_{SET}$ port of a PSID module in an embodiment may be equivalent to one of the digital voltage values given in column 302.

For example, in an embodiment described with respect to FIG. 2, an ADC 228 in an embodiment may measure one of a plurality of adjustable setting voltage values at $V_{SET}$ 216. For example, a voltage value measured across a second resistor 250 alone may be converted to a digital voltage value of ten. In another example, the ADC 228 in an embodiment in which thermally controlled MOSFET 246 is actuated may measure a voltage value across the activated voltage divider with $R_1$ 248 and $R_2$ 250 in parallel, and convert that measured voltage value to a digital voltage value of eleven.

Returning to FIG. 3, each row of a dynamic power supply identification information table 300 having a non-zero digital voltage value may constitute a PSID data record. For example, the third row from the top of the table 300 may be the first PSID data record 236. In some embodiments, two or more rows of the dynamic power supply identification information table 300 having a non-zero digital voltage value may constitute a single PSID data record, and may be associated with a single power adaptor model dynamic power rating. These two rows and digital voltage values may indicate multiple power levels in the dynamic power rating. For example, the twelfth and thirteenth rows in table 300, having digital voltage values of ten and eleven may constitute a second PSID data record 238, and both of these rows may be associated with the same power adaptor model, and with dynamic power rating 312, having a value of 65 Watts. As described herein, a single power adaptor model may be capable of generating a plurality of power values indicated by plural measurements of adjustable setting voltages at $V_{SET}$ by the ADC 228. Thus, a single power adaptor model may have a dynamic power rating associated with a plurality of digital voltage values. The plurality of digital voltage values may be indicative of multiple power levels in a dynamic power rating The dynamic power supply identification information table 300 may also associate each of the digital voltage values in column 302 with a dynamic power ratings for adaptor types given in column 304. Each of the values of column 304 in an embodiment may be given in watts. In some embodiments, a dynamic power rating may be associated with a single digital voltage value. For example, the dynamic power rating of 300 Watts given in the third row of the table 300 may be associated with only the digital voltage value of one. This may be the case, for example, where an operably connected power adaptor is not capable of delivering power according to a peak power state, and where the a plurality of voltages are not supplied for measurement by the ADC 228. In other embodiments, a dynamic power rating may be associated with two or more digital voltage values and correspond to two or more adjustable power levels. For example, the dynamic power rating 312 of 65 Watts for an adaptor in an embodiment may be associated with digital voltage values of both ten and eleven, as shown in the second PSID data record 238 of table 300. This may be the case, for example, where the power adaptor associated with both digital voltage values of ten and eleven is capable of operating according to a peak power state 314, and at a default power state 316, below peak power. Although only a maximum of two adjustable power levels are shown to be associated with a single dynamic power rating, it is understood that more than two or fewer than two adjustable power levels may be associated with a single dynamic power rating in variations of embodiments herein.

In previous systems, the power rating of 65 Watts may have been the only identified power state that was associated with a power adaptor model that was actually capable of generating 65 Watts at a default power level and 90 Watts at a peak power level. In other words, previous systems may have consistently indicated to the host information handling system that a power adaptor capable of a peak power level at 90 Watts was only capable of a single default power level of 65 Watts. Embodiments of the present disclosure improve upon these systems by providing a dynamic power rating for power adaptors capable of operating at peak power conditions to the host information handling system and dynamically adjusting between power levels for a given dynamic power rating. For example, table 300 in an embodiment may associate each digital voltage value in column 302 with a dynamic power rating in column 304 having a plurality of power levels in column 306.

As described herein, a single power adaptor in an embodiment may be associated with two separate digital voltage values generated by the ADC 228 based on an adjustable setting voltage measured at $V_{SET}$ port 216. For example, a single power adaptor in an embodiment may be associated with both digital voltage values of ten and eleven, as shown in the second PSID data record 238 of table 300. The digital voltage value of eleven may be associated in an embodiment with a dynamic power rating 316 of 65 Watts, but with a peak power state 314 of 90 Watts.

The PSID controller in an embodiment may determine which of the dynamic power ratings in 304 and which of a plurality of adjustable power levels in column 306 for a given PSID data record to transmit to the host information handling system. Adjustments to these values may also be based on the presence of operating conditions of the host information handling system and/or received override commands. For example, in an embodiment described with reference to FIG. 2, if the selection logic 230 has transmitted the second PSID data record 238 to the PSID controller 242, the PSID controller 242 may determine whether to transmit the peak power rating of 90 Watts or the default power rating of 65 Watts to the host information handling system 210. If the ADC 228 has generated a digital voltage value of ten, the PSID controller 242 may transmit the peak power rating of 90 Watts by default, when the host 210 indicates it is capable of receiving peak power, and in the absence of override commands from the host 210. For example, upon startup, the PSID controller 242 may transmit a reset instruction to the host 210 via SDQ line 212. If the host is capable of receiving peak power at startup, it may respond by transmitting a reply indicator via SDQ line 212. If the host is not capable of receiving peak power at startup, it may not respond. In an embodiment in which the PSID controller 242 receives a reply at startup, the PSID controller 242 may then transmit the peak power rating (e.g. 90 Watts) to the host 210 when a digital voltage value of ten is detected at $V_{SET}$ port 216. In an embodiment in which the PSID controller 242 does not receive a reply at startup, the PSID controller 242 may transmit the default power rating (e.g. 65 Watts) to the host 210, despite the fact that the ADC 228 generated a digital voltage value associated with the peak power rating of 90 Watts. This may be the case because the PSID controller 242 has identified that the host 210 is not capable of receiving the peak power identified in the dynamic power rating for the digital voltage value, and transmitted the default power level also associated with the same digital voltage value and dynamic power rating instead.

Similarly, the host 210 in an embodiment may transmit an override instruction to the PSID controller 242, prompting the PSID controller 242 to shift from the peak power level to the default power level for a dynamic power rating. For example, the host information handling system 210 in an embodiment may determine it has been receiving power at the peak power level identified in a given PSID data record from the operably connected power adaptor for a time duration equivalent to a preset time threshold value. In such an embodiment, the host 210 may then transmit an override signal to the PSID controller 242 via SDQ line 212. The PSID controller 242 may respond to such an override signal by transmitting an interrupt signal to the host 210, followed by the default power level from the same PSID data record. The host 210 may then limit the power received to the default power level.

In still other embodiments, although not illustrated in FIG. 3, the table 300 may include further columns indicating additional power levels, other than default and peak state. For example, an additional power level may have a value between the default and peak power levels, or below the default power level for a given dynamic power rating of an adaptor type. In such embodiments, each of the default power level, peak power level, and additional power levels may be associated with a single PSID data record. Further, such a single PSID data record in such an embodiment may be associated with three or more digital voltage values, according to various embodiments herein. In such an embodiment, three or more different adjustable set voltages values at $V_{SET}$ port 216 may be read by the ADC 228. For example, in an embodiment described with reference to FIG. 2, the power adaptor may cause multiple switched voltage divider circuits to yield a plurality of adjustable setting voltages at $V_{SET}$ port 216 and cause the ADC 228 to convert such plural measured setting voltages to plural digital voltage values.

Figure 4:
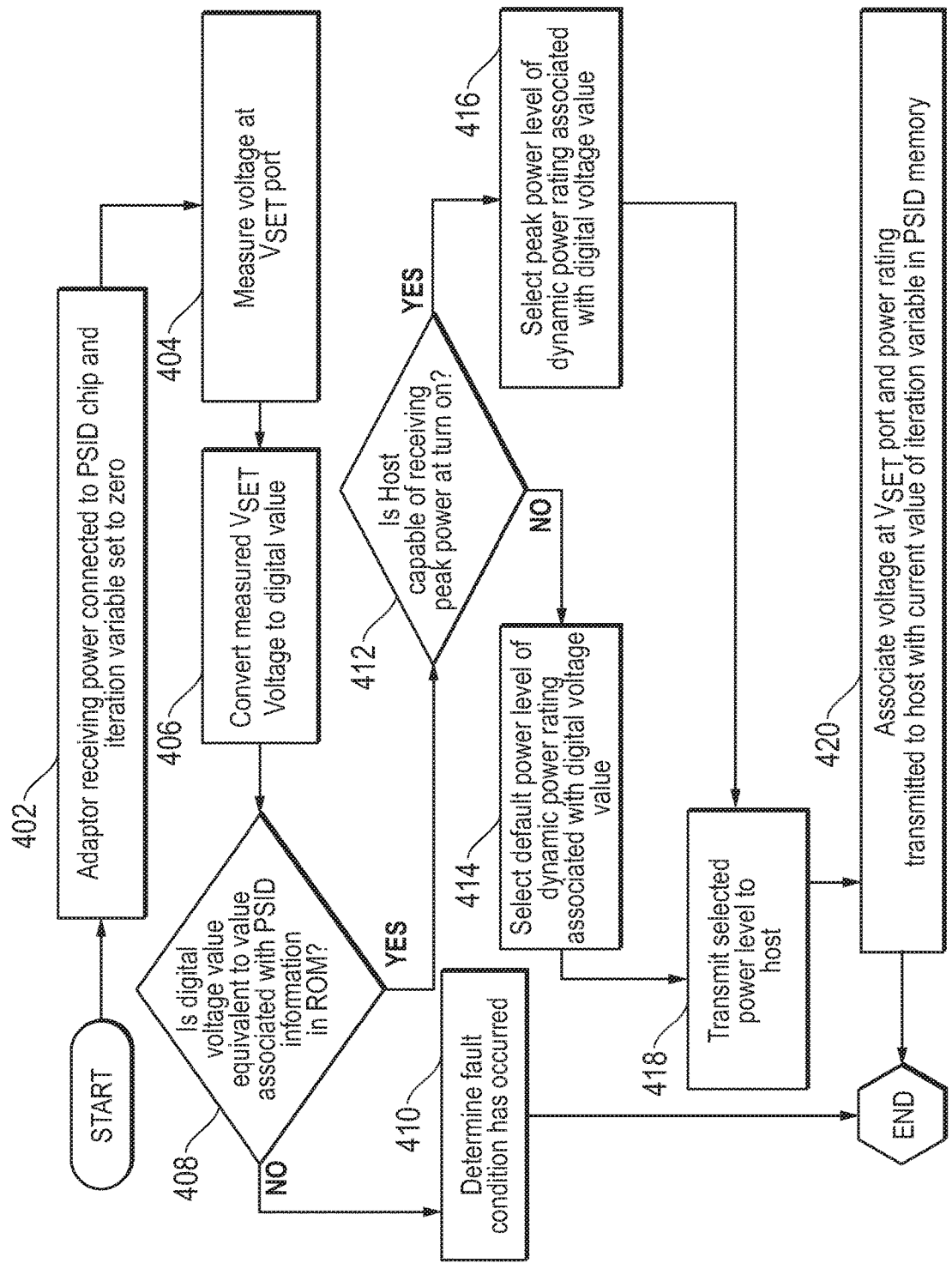
FIG. 4 is a flow diagram illustrating a method of determining a power rating for an operably connected power adaptor according to an embodiment of the present disclosure.

FIG. 4 is a flow diagram illustrating a method of determining a power source identification for an operably connected power adaptor at a turn-on event for the host information handling system according to an embodiment of the present disclosure. The power source identification associated with the power adaptor at the time of turn-on may include a dynamic, default, or other power rating, based on the capability of the power adaptor to function in a peak power state, and the ability for the host information handling system to support peak power functionality at turn-on.

At block 402, a power adaptor may be operably connected to the PSID module executing instructions of the dynamic PSID system. Upon connection, the power adaptor may supply power to the PSID module. For example, in an embodiment described with reference to FIG. 2, the PSID module 268 may receive power $V_{IN}$ 204 from the power adaptor via power connection 206 and $V_{CC}$ port 202. Upon power-on, the dynamic PSID system may set an iteration variable value to zero. The iteration variable may be used to determine when a new power adaptor having a potentially different PSID than the last operably connected power adaptor has been operably connected, prompting a need to determine the new adaptor's PSID. The iteration variable may also be used to compare voltage values and power ratings measured or determined between iterations to determine whether dynamic adjustments are needed.

A setting voltage $V_{SET}$ at $V_{SET}$ port of the PSID module may be measured in an embodiment at block 404. For example, in an embodiment described with reference to FIG. 2, in which both MOSFETs 246 and 254 are set to the default open position, the ADC 228 may measure a voltage $V_{SET}$ equivalent to a constant current supplied by the PSID module 268 and divided via voltage divider with the second resistor 250. As described herein, MOSFETs 246 and 254 may control the flow of current through each of several resistors dependent upon the temperature of one or more internal components of the power adaptor. Each of MOSFETs 246 and 254 may only redirect current to flow through other resistors (e.g. 248 and/or 256) as the internal temperature of power adaptor components increases.

As the current is diverted to flow through more resistors in an embodiment, the total voltage generated across the plurality of resistors by the resulting voltage divider may change relative to the voltage generated when current is directed toward the second resistor 250 alone. Similarly, because the resistors 248, 250, and 256 are arranged in parallel with respect to one another, as the number of resistors through which current flows increases, the total setting voltage $V_{SET}$ measured by the ADC 228 at $V_{SET}$ port 216 may also change. $V_{SET}$ may be increased in an embodiment as resistors 248 and 256 become active. For example, in an embodiment in which MOSFET 246 has directed current to flow only through the second resistor 250, ADC 228 may measure a voltage of 9.98 V. As another example, in an embodiment in which the temperature of thermistor 244 has increased to a threshold temperature value, MOSFET 246 may cause current to flow through the first and second resistors 248 and 250 in parallel. In such an embodiment, the ADC may measure a voltage of 10.88.

At block 406, the voltage measured by the ADC may be converted to a digital voltage value in an embodiment. An analog to digital converter may be used in an embodiment to convert the measured voltage to a digital value by rounding the measured value to the nearest whole number value. For example, in an embodiment described with reference to FIG. 2 in which ADC 228 measured a voltage of 9.98 V, ADC 228 may convert this measured value to a digital voltage value of 10 V. As another example, in an embodiment in which ADC 228 measured a voltage of 10.88 V at block 404, the ADC 228 may convert this measured value to a digital voltage value of 11 V.

The dynamic PSID system in an embodiment may determine at block 408 whether the digital voltage value is equivalent to a value associated with PSID data records stored in memory. PSID data records may be stored in a memory of the PSID module. For example, in an embodiment described with reference to FIG. 2, a plurality of PSID data records 236-240 may be stored in ROM of the PSID module 268. Each PSID data record 236-240 in an embodiment may be associated with one or more digital voltage values generated by the ADC 228.

For example, in an embodiment described with reference to FIG. 3, the third row from the top of the table 300 may be the first PSID data record 236, which may only include the single digital voltage value of one. In some embodiments, two or more rows of the dynamic power supply identification information table 300 having a non-zero digital voltage value may constitute a single PSID data record, and may be associated with a single power adaptor model. For example, the twelfth and thirteenth rows from the top of table 300, having digital voltage values of ten and eleven may constitute the second PSID data record 238, and both of these rows may be associated with the same power adaptor model and dynamic power rating. Each row of the table 300 may provide one or more power levels describing the operational capabilities of the operably connected power adaptor delivering power to the host information handling system. All power levels for known power adaptor model dynamic power ratings may be associated with a non-zero digital voltage value in the table 300 in an embodiment. A digital voltage value of zero, or a value greater than a digital voltage value associated with any known power adaptors may indicate an unexpected event has occurred, such as, for example, the power capabilities of the power adaptor not being known, occurrence of an over voltage event, or occurrence of an under voltage event. If the digital voltage value converted by the ADC is equivalent to a value associated with PSID information in ROM, the method may proceed to block 412 to identify the operably connected power adaptor dynamic power rating and adjustable power level. If the digital voltage value converted by the ADC is not equivalent to a value associated with PSID information, the method may proceed to block 410.

At block 410, if the digital voltage value is not equivalent to a value associated with PSID information, the dynamic PSID system in an embodiment may determine that a fault condition has occurred. A fault condition may include connection with an unidentified power adaptor, or an over-voltage, or under-voltage event in an embodiment. For example, if an under-voltage event occurs, an insufficient amount of voltage may be generated across the one or more resistors 248, 250, and/or 256, causing the ADC 228 to generate a digital voltage value of zero. As another example, in an over-voltage event, an over-voltage protection circuit 266 within the PSID module 268 may open the switch between the ADC 228 and the $V_{SET}$ port 216, such that the ADC 228 reads a voltage value of zero. In such a scenario, the ADC 228 may again generate a digital voltage value of zero. The PSID module 268 may then identify a fault condition. Once a fault condition has been identified, the method of identifying the operably connected power adaptor may end.

If the digital voltage value is equivalent to a value associated PSID information, the dynamic PSID system in an embodiment may determine at block 412 whether the host information handling system is capable of receiving peak power at turn on. Some power adaptors in an embodiment may be capable of operating in a default state, or in a peak-power state in which a greater wattage is delivered to the host information handling system. In addition, some host information handling systems may be capable of receiving peak power during turn-on of the information handling system, while others may not. In still other embodiments, some power adaptors may not be capable of delivering power in a peak-power state, and some host information handling systems may not be capable of receiving power in a peak-power state, even subsequent to turn-on. Each of these factors influence the determination by the dynamic PSID system in an embodiment to employ a default power level within a dynamic power rating when a host does not support peak power capabilities, or to employ a dynamic power rating supporting peak power and other power levels such as a default power level.

For example, in an embodiment described with reference to FIG. 2, upon startup, the PSID controller 242 may transmit a reset instruction to the host 210 via SDQ line 212. If the host is capable of receiving peak power at startup, it may respond by transmitting a reply indicator via SDQ line 212. If the host is not capable of receiving peak power at startup, it may not respond. In an embodiment in which the PSID controller 242 receives a reply at startup, the PSID controller 242 may then transmit the peak power level within the dynamic power rating to the host 210. In an embodiment in which the PSID controller 242 does not receive a reply at startup, the PSID controller 242 may transmit the default power level within the dynamic power rating to the host 210, despite the fact that a peak power level is available. This may be the case because the PSID controller 242 has identified that the host 210 is not capable of receiving the peak power identified in the dynamic power rating. If the host is not capable of receiving peak power at turn on, the method may proceed to block 414, where a default power level may be used. If the host is capable of receiving peak power at turn on, the method may proceed to block 418 for use of a peak power level associated with a dynamic power rating for the power adaptor.

The dynamic PSID system in an embodiment may select a default power level associated with the converted digital voltage rather than a peak power level associated with the converted digital voltage value at block 414 if the host information handling system does not support peak power at turn on. As described herein, a single power adaptor in an embodiment may be associated with two (or more) separate digital voltage values when the power adaptor is capable of generating a plurality of voltages for the ADC 228 to measure. For example, a single power adaptor in an embodiment may be associated with both digital voltage values of ten and eleven, as shown in the second PSID data record 238 of table 300. The digital voltage value of eleven may be associated in an embodiment with a default power level 316 of 65 Watts, a peak power level 314 of 90 Watts, and a dynamic power rating 312 of 65 Watts for the second PSID data record 238 of an identified adaptor. In such an embodiment, if the selection logic 230 has transmitted the second PSID data record 238 to the PSID controller 242, the PSID controller 242 may determine whether to transmit the peak power level of 90 Watts or the default power level of 65 Watts to the host information handling system 210 at turn-on. For example, at block 414, in an embodiment in which the ADC 228 has generated a digital voltage value of ten, the PSID controller 242 may transmit the default power level of 65 Watts if the host 210 does not respond to a reset command transmitted by the PSID controller 242, because a lack of response may indicate the host 210 is not capable of supporting peak power at turn-on.

The method of FIG. 4 may apply only to the instance in which the host information handling system is first receiving power from the adaptor (turn-on). As described in greater detail with reference to FIG. 5, the dynamic PSID system in an embodiment may move adaptively between dynamic and default power levels for a given power adaptor dynamic power rating following turn-on of the host information handling system based on several factors. Once the default power rating has been selected at block 414, the method may proceed to block 418 for transmission of the selected power rating to the host information handling system.

If the host information handling system does support peak power at turn-on, the dynamic PSID system in an embodiment may select the peak power level of the dynamic power rating associated with the digital voltage value at block 418. For example, if the ADC 228 has generated a digital voltage value of ten, the PSID controller 242 may transmit the peak power level of 90 Watts if the host 210 responds with a reply indicator via SDQ line 212 to a reset command transmitted by the PSID controller 242. Thus, the dynamic PSID system in an embodiment may either select the default power level of 65 W associated with the digital voltage value of ten, as described at block 414, or may select the peak power level of 90 W associated with the digital voltage value of ten, as described here at block 416. In such a way, the dynamic PSID system may allow for operation of a single power adaptor according to two different states of that power adaptor (e.g. default, and peak-power) at turn-on. Additional power level states are also contemplated in other embodiments for an identified dynamic power rating as well.

At block 418, the dynamic PSID system in an embodiment may transmit the selected power level to the host information handling system. The power source identification module may transmit the selected power level to a power controller of the information handling system for optimizing the information handling system's power configuration. For example, in an embodiment described with reference to FIG. 2, in which the default power level from the second PSID data record 238 has been selected, the selection logic 230 may retrieve the second PSID data record 238 via MUX 234, and then transmit it to PSID controller 242. The PSID controller 242 may then transmit the default power level of 65 W of the second PSID data record 238 to the host information handling system 210 via SDQ proprietary one-wire bus interface line 212. Then the default power level of 65 Watts may be provided via the power connection 224 to host 210. As another example, in an embodiment in which the peak power level of the second PSID data record 238 has been selected, the selection logic 230 may transmit the second PSID data record 238 to PSID controller 242, which may then transmit the peak power level data for 90 W within the second PSID data record 238 to the host information handling system 210 via SDQ proprietary one-wire bus interface line 212. Then this peak power level of 90 Watts may be provided to host 210 via power connection 224. The SDQ line 212 and power connection 224 may be coaxially situated within a barrel-type connector or cord in some embodiments.

At block 420, the dynamic PSID system in an embodiment may associate the measured voltage and the PSID information transmitted to the host information handling system with the current value of the iteration variable in memory. For example, in an embodiment in which the dynamic PSID system transmitted the peak power level of 90 W associated with the digital voltage value of ten to the host information handling system at block 418, the dynamic PSID system may associate that transmitted 90 W peak power level with the voltage of 9.98 V measured by the ADC at block 404. This stored information may then be used subsequent to the start-up of the information handling system to dynamically alternate between default and peak power levels as conditions warrant.

Figure 5:
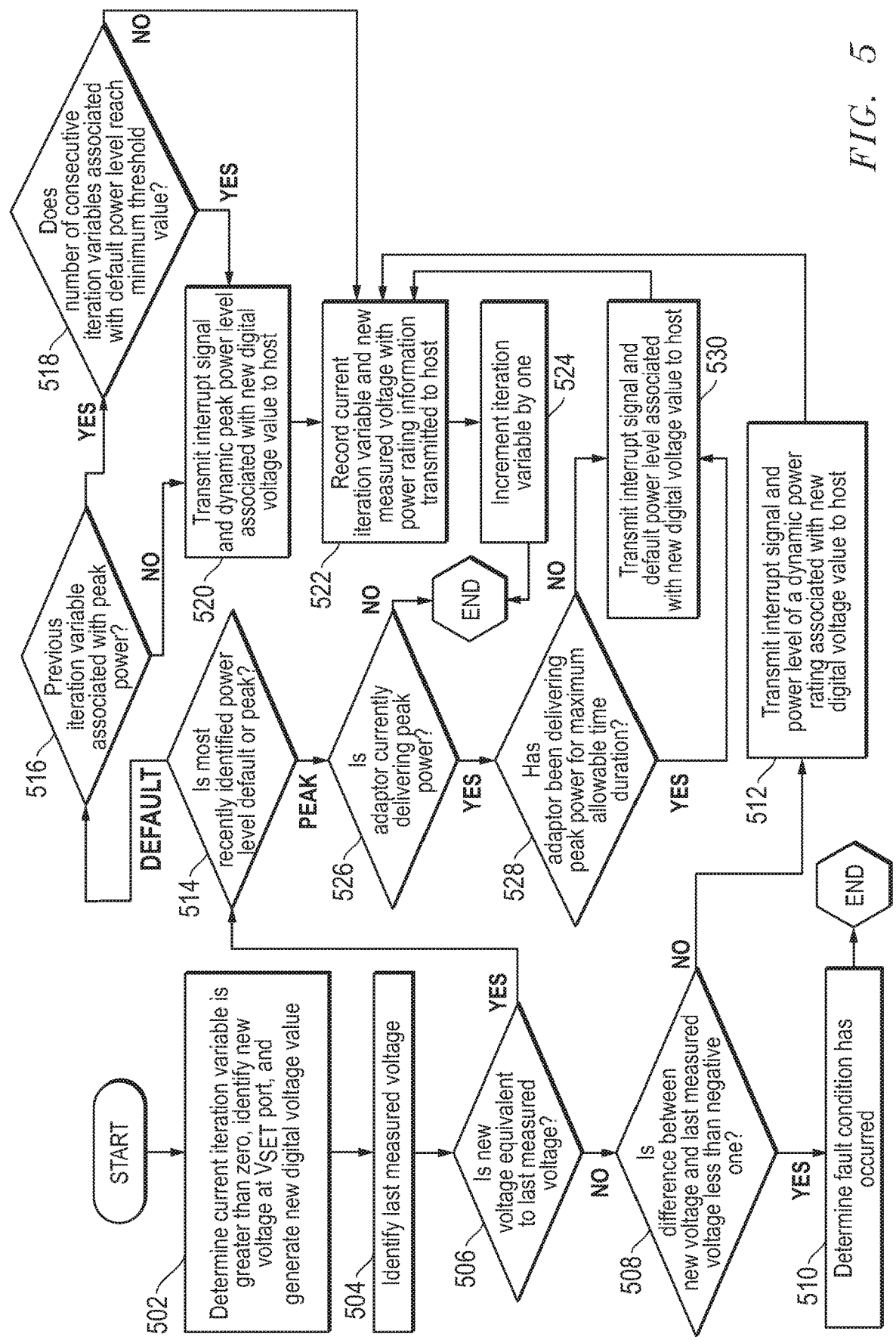
FIG. 5 is a flow diagram illustrating a method of dynamically adjusting the power rating for an operably connected power adaptor according to an embodiment of the present disclosure.

FIG. 5 is a flow diagram illustrating a method of dynamically adjusting the power levels within a dynamic power rating associated with an operably connected power adaptor based on operating conditions of the host information handling system and other factors according to an embodiment of the present disclosure. The configuration of the power connection between the power adaptor and the host information handling system may be dynamically adjusted over time at regular intervals in order to adaptively optimize the power connection. The method described with reference to FIG. 5 may describe the ways in which the dynamic PSID system in an embodiment may identify an appropriate power level of such a power connection subsequent to the host information handling system first receiving power (turn-on), based on a plurality of factors. This method may be repeated at regular intervals in an embodiment.

At block 502, the dynamic PSID system in an embodiment may determine the current iteration variable is greater than zero, and measure a new setting voltage $V_{SET}$ at the $V_{SET}$ port. As described with reference to FIG. 4, the iteration variable may be set to zero at the beginning of that method, and may be incremented to a value of one upon transmission of a default or dynamic power rating to the host information handling system. As such, the iteration variable may only have non-zero value after the host information handling system has first received power (e.g. after the turn-on event for the host). Once it is determined the host information handling system is not currently undergoing a turn-on event by identifying a non-zero iteration variable value at block 502, the ADC in an embodiment may measure the setting voltage $V_{SET}$ at the $V_{SET}$ port. In an embodiment described with reference to FIG. 2, for example, the measured setting voltage $V_{SET}$ may depend upon whether the constant current supplied by the PSID module 268 is routed to flow through the second resistor 250 alone, or a through a combination of the second resistor 250 and one or both of the first resistor 248 and the third resistor 256. The ADC 228 may convert the newly measured $V_{SET}$ setting voltage to a new digital voltage value for use in identifying a power rating for the operably connected power adaptor. For example, the ADC 228 may convert a measured voltage value of 9.98 V generated across only the second resistor 250 while the power adaptor is delivering power at peak voltage to a digital voltage value of 10 V. As another example, the ADC 228 may convert a measured voltage value of 10.88 V generated across the parallel first and second resistors 248 and 250 when one or more components of the power adaptor reach a threshold maximum temperature value to a digital voltage of 11 V. Other $V_{SET}$ and digital voltage values are understood depending on output voltage $V_{DD}$ and resistors 248, 250, and 256 activated in various voltage dividers.

The dynamic PSID system in an embodiment may identify a last measured voltage at block 504. As described in an embodiment with reference to FIG. 4, once a dynamic power rating is identified, and a power level selected during the turn-on event, and transmitted to the host information handling system, the dynamic PSID system may store an association between the transmitted power level, the measured voltage that informed selection of the transmitted power level, and the current iteration variable value (e.g. value of zero during a turn-on event). In other embodiments, the dynamic PSID system may similarly store such an association with a current iteration variable value (e.g. non-zero value) each time the method of FIG. 5 is repeated and a new power level is potentially transmitted to the host information handling system. Such associations may assist in comparing operating conditions of the power adaptor, and of the host information handling system over time.

At block 506, the dynamic PSID system in an embodiment may determine whether the new measured voltage is equivalent to the last measured voltage. The measured voltage in an embodiment may change over time if a new power adaptor is operably connected to the host information handling system, if the temperature of one or more internal components of the power adaptor reach a critical temperature, or if an over-voltage or under-voltage condition occurs. Each time the method of FIG. 4 or the method of FIG. 5 is performed, the dynamic PSID system in an embodiment may store an association between the current iteration variable value and a measured setting voltage $V_{SET}$ at the $V_{SET}$ port of the PSID module for that iteration. If the new voltage measured at block 502 is equivalent to the measured voltage associated with the iteration variable immediately preceding the current iteration variable, the method may proceed to block 514. If the new measured voltage is not equivalent to the measured voltage associated with the most recent iteration variable, the method may proceed to block 508 to determine possible causes for such a change.

The dynamic PSID system in an embodiment may determine whether the absolute value of the difference between the new measured voltage and the most recently measured voltage is less than the absolute value of the difference between the maximum digital voltage value associated with the operably connected power adaptor and the minimum digital voltage value associated with the operably connected power adaptor at block 508. As described herein, a single power adaptor may be associated with a plurality of digital voltage values. For example, in an embodiment described with reference to FIG. 2, one or more thermistors 244 and 256 may be capable of routing a constant current supplied by the PSID module 268 through one or more resistors, dependent upon a measured temperature of one or more components of the power adaptor located nearby the thermistors 244 and/or 252. As the temperature of a component nearby thermistor 244 increases, the resistance of thermistor 244 decreases, causing the voltage received at MOSFET 246 gate to increase. Once the thermistor 244 drops its resistance sufficiently to allow the voltage received at the gate of MOSFET 246 to increase to a threshold switching value, MOSFET 246 may close its gate to then route current across both the first 248 and second 250 resistors in parallel.

The constant current supplied by PSID module 268 in an embodiment may be capable of generating a measured setting voltage $V_{SET}$ of 9.98 V when MOSFET 246 routes all current through only the second resistor 250, and of generating a measured voltage of 10.88 V when MOSFET 246 routes current through both parallel resistors 248 and 250 in an example embodiment. In such an embodiment, the single power adaptor may be associated with both a digital voltage value of 10 and a digital voltage value of 11. In still other embodiments, the same single power adaptor may be capable of generating a third and fourth measured voltage when MOSFET 254 closes, to route current through a third resistor 256. In such an embodiment, the same power adaptor may be associated with up to four separate digital voltage values when combinations of the voltage dividers including resistors 248, 250, and 256 are activated.

At block 508, the dynamic PSID system may determine whether the newly measured voltage could be generated by the same power adaptor that generated the voltage measured during the most recent iteration. For example, the power adaptor associated with the voltage measured during the most recent iteration in an embodiment may be associated with two digital voltage values that differ by an absolute value of one. In such an embodiment, a difference between the new measured voltage and the voltage measured during the most recent iteration having an absolute value greater than one in an embodiment may indicate the new measured voltage is not being generated by the same power adaptor that generated the voltage measured in the most recent iteration. As another example, the power adaptor associated with the voltage measured during the most recent iteration in another embodiment may be associated with four digital voltage values, including a maximum digital voltage value and a minimum voltage value that differ by an absolute value of four. In such an embodiment, a difference between the new measured voltage and the voltage measured during the most recent iteration having an absolute value greater than four in an embodiment may indicate the new measured voltage is not being generated by the same power adaptor that generated the voltage measured in the most recent iteration.

In contrast, if the measured voltage has changed by an absolute value less than the difference between a minimum digital voltage value and a maximum digital voltage value in the PSID data record transmitted to the PSID controller 242 during the most recent iteration in an embodiment, this may indicate the same power adaptor has generated the most recent measured voltage and the current voltage. For example, if the ADC 228 measures a new voltage of 10.88 V at block 502, and identifies a most recent voltage measurement of 9.98 V at block 504, the absolute value of the difference between these two measurements may be less than one. Further, a single power adaptor may be associated in PSID data record 238 with both the digital voltage value of 10 V and the digital voltage value of 11 V. Thus, the absolute difference between the maximum digital voltage value associated with that power adaptor and the minimum digital voltage value associated with the same power adaptor may be one. In such a scenario, it may be determined that the power adaptor that generated the voltage measured at block 502 could be the same power adaptor that generated the voltage measured in the most recent iteration. If the measured voltage in an embodiment has changed by a value less than negative one (e.g. by an absolute value greater than one), this may indicate an over-voltage or under-voltage condition has occurred, or that the power adaptor whose power rating was transmitted to the host information handling system during the most recent iteration of the method of FIG. 4 or FIG. 5 has been disconnected from the PSID module. The method may proceed to block 510 in such an embodiment. If the measured voltage in an embodiment has not changed by a value less than negative one, the method may proceed to block 512.

At block 510, the dynamic PSID system in an embodiment may determine a fault condition has occurred if the measured voltage has changed by an absolute value greater than one between iterations. This may occur if the power adaptor has been disconnected, or if another under-voltage or over-voltage condition occurs. These may trigger a fault detection indication at fault detection circuit 232 in an example embodiment. Both of these scenarios may require the dynamic PSID system in an embodiment to restart the method of FIG. 4, thus resetting the iteration variable value to zero. The method of optimizing the power connection between the power adaptor and the host information handling system may then end.

At block 512, the dynamic PSID system in an embodiment may transmit an interrupt signal and a dynamic power rating associated with the new digital voltage value to the host information handling system if the difference between the new measured voltage and the voltage measured during the previous iteration does not meet the threshold absolute value described in block 508. If the new measured voltage in an embodiment differs from the measured voltage of the most recent iteration by an absolute value less than the threshold absolute value described in block 508, this may indicate the same power adaptor generated the newly measured voltage as well as the voltage measured during the most recent iteration. This may occur, for example, if the temperature of one or more internal components of the power adaptor reaches a threshold maximum in between the current iteration and the most recent iteration and changes the adjusted $V_{SET}$ values in a thermally controlled MOSFET such as 246 or 254.

In an embodiment described with reference to FIG. 2, for example, MOSFET 246 may be open and pass all current through only the second resistor 250 in the most recent iteration, causing the ADC to measure a voltage of 9.98 V, and generate a digital voltage value of 10 V. Since the most recent iteration, thermistor 244 may have reached a temperature high enough to cause MOSFET 246 to close. Current across both resistors 248 and 250, during the current iteration, may generate a voltage of 10.88 V, and ADC 228 may generate a digital voltage value of 11 V.

Thermistor 244 and MOSFET 246 may be designed in such an embodiment specifically to increase the generated digital voltage value from 10 V to 11 V when internal temperatures reach maximum allowable thresholds. Changing the digital voltage value in such a way may indicate to the PSID controller 242 that the power adaptor is switching from a peak power rating (e.g. 90 W) to a lower power rating (e.g. 65 W) to decrease temperatures of internal components of the power adaptor. The PSID controller 242 in an embodiment may respond to such an indication of changed digital voltage value by transmitting an interrupt signal to the host information handling system 210 via SDQ line 212, then transmitting the dynamic power rating associated with the newly generated digital voltage value. For example, the PSID controller 242 in such an embodiment may transmit an interrupt signal to the host information handling system 210, indicating it should now disregard the most recently transmitted peak power level of 90 W associated with the previous digital voltage value of 10 V. The PSID controller 242 in such an embodiment may then transmit the dynamic power rating default power level of 65 W associated with the newly generated digital voltage value of 11 V. In such a way, the PSID module 268 may dynamically adjust the power rating used by the host 210 to set its power control policies, based on operating conditions of the power adaptor. The method may then proceed to block 522 in preparation for the next iteration of the method of FIG. 5.

Returning to FIG. 5, in an embodiment in which the new measured voltage is equivalent to the voltage measured in the most recent iteration at 506, the dynamic PSID system may determine at block 514 whether a default power level or a peak power level of the dynamic power rating was most recently transmitted to the host information handling system. For example, in an embodiment described with reference to FIG. 3, the PSID controller may have most recently transmitted the default power level of 65 W associated with the digital voltage value of 10 V and the dynamic power rating of 65 W in the second PSID data record 238 to the host information handling system. This may have occurred in an embodiment in which the most recent iteration occurred during the power-on event for a host information handling system that does not support peak power at turn-on, or in an embodiment in which the power level has been stepped down from the peak power level due to operating conditions of the power adaptor. As another example, the PSID controller may have most recently transmitted the dynamic power rating peak power level of 90 W associated with the digital voltage value of 10 V in the second PSID data record 238 to the host information handling system. This may have occurred in an embodiment in which the most recent iteration occurred during the power-on event for a host information handling system that supports peak power at turn-on, or in another embodiment in which operating conditions of the power adaptor and host information handling system warranted use of the peak power level. If the most recently identified power level was a peak power level, the method may proceed to block 526 to determine whether a switch to the lower default power level is warranted. If the most recently identified power level is a default power level, the method may proceed to block 516 to determine whether an increase the current power level is warranted.

At block 516, in an embodiment in which the most recently identified power level is a default power level, the dynamic PSID system may determine whether a previous iteration variable has been associated with peak power. An association between a previous iteration variable and a peak power level in an embodiment in which the most recently identified power level is a default power level may indicate that the dynamic PSID system has previously adjusted the power level from the peak power level to the default power level. As described herein, this may have occurred previously due to overheating of components within the power adaptor, or in response to an indication from the host information handling system that it can no longer support peak power. In such a scenario, the method may proceed to block 518 for determination as to whether the conditions that prompted the previous shift from the peak power level to the default power level still exist.

In another scenario, a lack of association between a previous iteration variable and a peak power level may indicate the host information handling system has completed startup and is now prepared to receive peak power. If a host information handling system does not support peak power at turn-on, the dynamic PSID system in an embodiment may transmit a default power level below peak power to the host information handling system at turn-on, as described in an embodiment at block 418 with reference to FIG. 4. In such an embodiment, as described at block 420, the dynamic PSID system may also associate the initial iteration variable with the default power level. Once start-up has concluded in an embodiment, the dynamic PSID system may again transmit a reset instruction to the host information handling system, and the host may transmit a reply indicating the host may now receive peak power. In the absence of any previous iteration variables associated with a peak power level in an embodiment, the method may proceed to block 520 to prompt the host information handling system to begin receiving peak power.

At block 518, the dynamic PSID system in an embodiment may determine whether a number of consecutive iteration variable associated with a default power level has reached a minimum threshold value. As described herein, an association between a previous iteration variable and a peak power level in an embodiment in which the most recently identified power level is a default power level may indicate previous overheating of components within the power adaptor, or previous indications from the host information handling system that it can no longer support peak power. The host information handling system in an embodiment may transmit such an indication, for example, when it has received peak power for a time period meeting a threshold value. In other words, the host information handling system may be capable of receiving peak power for a limited, preset time period, and may need to receive power at the lower default power rating for another preset time period before beginning to receive peak power again. If the duration of these preset time periods between peak power is known, the dynamic PSID system in an embodiment may set the threshold value for the number of iterations in block 518 to the number of iterations of the method of FIG. 5 that may occur during these preset time periods. In such an embodiment, once the number of consecutive iteration variables associated with the default power level has been met, it may be safe for the host information handling system to begin receiving peak power levels again, and the method may proceed to block 520. If the number of consecutive iteration variables associated with the default power level has not been met, the host information handling system may need to continue to receive power at the default power level, and the method may proceed to block 522.

The dynamic PSID system in an embodiment may transmit an interrupt signal to the host information handling system at block 520. This situation may occur if the previous iteration occurred during a turn-on event and the host information handling system does not support peak power at turn on. As described above, in such a scenario the PSID controller 242 may transmit a default power level to the host information handling system 210 via SDQ line 212, despite the availability of a peak power level supporting peak power associated with the same digital voltage value generated at block 502. In such an embodiment, upon determining the host information handling system is no longer in a turn-on event, the PSID controller 242 may transmit an interrupt signal to the host information handling system as an indicator to the host information handling system that it is about to receive new or updated power level. For example, in an embodiment described with reference to FIG. 2, the PSID controller 242 executing code instructions of the dynamic PSID system may transmit an interrupt signal to the host information handling system 210 via SDQ line 212 in anticipation of transmitting a new power level to the host 210. In another embodiment, the dynamic PSID system may transmit an interrupt signal and a peak power level to the information handling system at block 520 if the host information handling system has previously been switched from a peak power level to a default power level, but is not ready to receive peak power again, as indicated at block 518.

The dynamic PSID system may then transmit the peak power level associated with the new digital voltage value determined at block 502 to the host information handling system. For example, the PSID controller 242 in an embodiment may have most recently transmitted to the host information handling system the default power level associated with the digital voltage value of 10 V, indicating a default power rating of 65 Watts. In such an embodiment, if the new voltage value of the current iteration is equivalent to the last voltage value, such that the digital voltage values from both iterations also match, the dynamic PSID system at block 522 may transmit the peak power level of 90 W also associated with the digital voltage value of 10 V. Upon receipt of this information, the host information handling system may then reconfigure its power policies to account for receipt of power at the higher level of 90 W.

At block 522, the dynamic PSID system in an embodiment may record the current iteration variable and new voltage measured at block 502 in the current iteration with the power rating most recently transmitted to the host. For example, the dynamic PSID system in an embodiment may record the iteration variable identified as non-zero at block 502, and the new voltage measured at block 502 with the peak power level of 90 W transmitted to the host information handling system at block 522 or with the default power level of 65 W transmitted to the host at block 520. Such a recording may be stored in memory of the PSID module (e.g. ROM), and may be used in later iterations of FIG. 5 at blocks 506, 508, and 514.

The dynamic PSID system in an embodiment may increment the iteration variable by a value of one at block 524. The method for the current iteration may then end, and another iteration of FIG. 5 may begin at a later time. For example, incrementing the iteration variable in an embodiment may prompt the dynamic PSID system to begin a new iteration of the method of FIG. 5. In other embodiments, such an iteration may prompt a timer to begin, and performance of a new iteration of the method of FIG. 5 at the termination of the preset timer. By repeatedly performing the method of FIG. 5 at regular intervals in such a way, the dynamic power source identification system in embodiments may dynamically adjust the power level received by the host information handling system based on operating conditions of the power adaptor and host information handling system.

The dynamic PSID system in an embodiment in which the most recently identified power level is a peak power level may determine at block 526 whether the adaptor is currently delivering peak power. As described herein, a dynamic power rating for a given digital voltage value may be equivalent to the peak power level, or maximum power a power adaptor is capable of delivering to the host information handling system, or may be equivalent to the default power level having a value below the peak power level. For example, in an embodiment described with reference to FIG. 3, a power adaptor associated with a digital voltage value of 10 V may also be associated with a peak power level 314 of 90 Watts, which may be the maximum wattage at which the power adaptor may deliver power. In another example, the power adaptor associated with a digital voltage value of 11 V may also be associated with a dynamic power rating 312 of a default power level at 65 Watts, which may be equivalent to the default power level 316 for that digital voltage value.

If the power adaptor is currently delivering peak power, the dynamic PSID system may need to check to ensure the delivery of higher wattage power is not adversely affecting the operating conditions of the host information handling system, and the method may proceed to block 528. If the power adaptor is not currently delivering peak power due to override or some other reason, the measured voltage has not changed between iterations, and the host information handling system has most recently received a peak power level notification, the host information handling system may currently be receiving power according to the most efficient power rating, and the method may end.

At block 528, the dynamic PSID system in an embodiment may determine whether the adaptor has been delivering peak power for a preset maximum allowable time duration or may receive some feedback from the host information handling system that it does not require peak power. Safety requirements for the host information handling system may cap the duration of time over which it may receive peak power in some embodiments. Such a cap may be preset and stored in the PSID module in an embodiment. In another embodiment, such a cap or other criterion to indicate no further need of peak power may be stored in a memory of the host information handling system. The host information handling system may transmit an override message to the PSID module via the SDQ line when the host information handling system determines it has been receiving peak power for a time duration equivalent to the capped value or there is no further need of peak power. The host information handling system may take such precautions in order to avoid over heating of one or more components of the information handling system, or in accordance with other power policies of the information handling system.

An example of a preset maximum allowable time duration in an embodiment may be five minutes, or ten minutes. Other preset time durations are also contemplated, as are time durations set based on current operating conditions of the host information handling system. For example, a shorter preset maximum time duration may be employed when the average temperature of the host information handling system or ambient temperature surrounding the host information handling system is above a preset threshold, or if a light sensor for the host information handling system indicates the host information handling system may be operating outdoors. If the adaptor has been delivering peak power for the maximum allowable time duration, or some other criterion is met indicating no need for peak power, the method may proceed to block 530 to decrease the wattage of incoming power. If the adaptor has not been delivering peak power for the maximum allowable time duration, the host information handling system may currently be receiving power according to the most efficient power rating, and the method may proceed to block 522 for preparation for the next iteration of the method of FIG. 5.

The dynamic PSID system may transmit an interrupt signal and a default power level at block 530 in an embodiment if the adaptor has been delivering peak power for the maximum allowable time duration. In such a scenario, the peak power currently being delivered to the host information handling system may be causing sub-optimal operating conditions for the host information handling system, and the dynamic PSID system may need to decrease the power supplied to the host information handling system. The dynamic PSID system may respond by transmitting an interrupt signal to the host information handling system via an SDQ line, indicating the host information handling system is about to receive a new power level. For example, in an embodiment described with reference to FIG. 2, the PSID controller 242 that transmitted a peak power level of 90 W associated with a digital voltage value of 10 V in the second PSID data record 238 may transmit an interrupt signal to the host information handling system 210 via SDQ line 212. The PSID controller 242 in such an embodiment may then select the default power level of 65 W also associated with the digital voltage value of 10 V in the second PSID data record 238, and transmit the newly selected default power level of 65 W to the PSID controller 242. The PSID controller 242 may then transmit the new default power level indication of 65 W to the host information handling system 210 via SDQ line 212. The power transmitted to the host 210 may also be reduced at power connection 224. The method may then proceed to block 522 in preparation for a new iteration of the method of FIG. 5.

Figure 6:
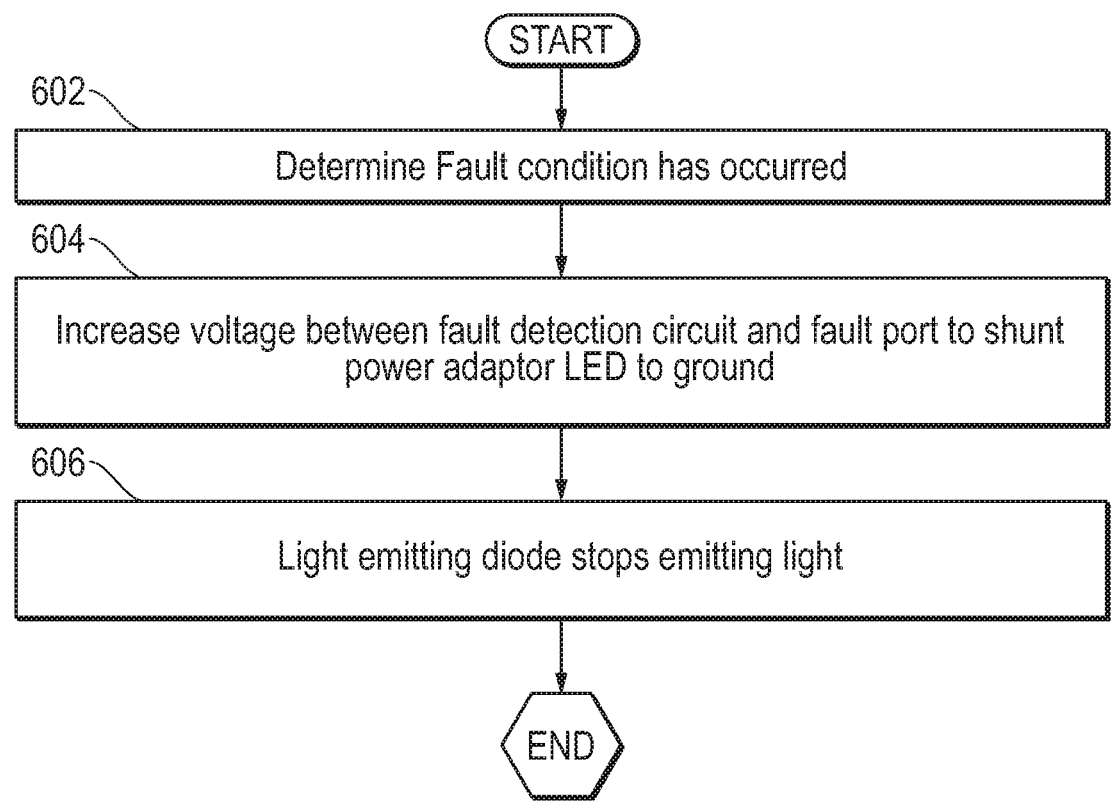
FIG. 6 is a flow diagram illustrating a method of turning off a light emitting diode of a power adaptor upon occurrence of a fault condition according to an embodiment of the present disclosure.

FIG. 6 is a flow diagram illustrating a method of detecting and managing a fault condition in an adaptor connected to a host information handling system and indicating such a disconnection to a user upon occurrence of a fault condition according to an embodiment of the present disclosure. In prior art systems, when a fault condition occurs, the power connection between the power adaptor and the host information handling system may be disconnected, causing no power to be delivered to the host information handling system. In such prior art systems, the LED light onboard a power adaptor may continue to emit light, however, causing a user to mistakenly believe the power adaptor is operating normally. Users in such scenarios may conclude the host information handling system is not functioning properly and may return both the power adaptor and the host information handling system for repair or refund. This scenario could occur when, in fact, the power adaptor was flawed, and the host information handling system is operating as intended. Embodiments of the present disclosure avoid such unnecessary returns and associated costs by transmitting an instruction upon a fault condition to cause the LED of the power adaptor to stop emitting light, and this may then indicate to the user that the power adaptor is malfunctioning, rather than the host information handling system.

At block 602, the dynamic PSID system in an embodiment may determine a fault condition has occurred. For example, in an embodiment described with reference to FIG. 2, a fault condition may occur when the PSID module 268 encounters an over voltage event in which the voltage $V_{IN}$ 204 received via the $V_{CC}$ port 202 and measured via the over voltage protection circuit (OVP) 266 spikes above a threshold over voltage value. This may occur, for example, when the SDQ line 212 shorts to the power connection 206 in an embodiment in which the SDQ line 212 and the power connection 206 are coaxially oriented in the same barrel-type adaptor cord. In such an event, the OVP 266 may cause MOSFET 270 to divert power to $V_{SS}$ port 220, which may effectively ground power to the host 210, rather than delivering power to the host 210 via power connection 224. Another fault condition may occur when the voltage $V_{IN}$ 204 received via the $V_{CC}$ port 202 and measured via OVP 266 falls below a threshold under voltage value, otherwise known as an under voltage event.

These and other fault conditions may be detected via a setting voltage at $V_{SET}$ port 216. ADC 228 may detect and convert a measured adjustable setting voltage. ADC 228 converts that measured voltage to a digital voltage value, but the converted digital voltage value may not match any of the PSID data records 236-240 stored in ROM, or may indicate one of the fault conditions. In one scenario, during an over voltage event, the fault detection circuit 232 detects a fault event, then the OVP 266 may cause a switch between $V_{SET}$ port 216 and ADC 228 to close, sending power received via power connection 226 to ground. In such an example embodiment, ADC 228 may read a measured voltage of zero, and generate a digital voltage value of zero. The fault detection circuit 232 may then recognize a fault condition has occurred.

The dynamic PSID system in an embodiment may shunt the power supplied to the LED to ground at block 604 when a fault condition has been detected. For example, in an embodiment described with reference to FIG. 2 in which the fault detection circuit 232 determines the digital voltage value does not match a PSID data record (e.g. because it is too high or zero), the fault detection circuit 232 may detect the fault condition, the fault detection circuit 232 may supply a gate voltage sufficient to cause MOSFET 258 to close.

At 606, the fault port 214 in such an embodiment may be operably connected to the same power line to the LED 262 preventing current to LED 262. In such an embodiment, by closing MOSFET 258, the fault detection circuit 232 may effectively cause the light emitting diode to stop emitting light. For example, in an embodiment described with reference to FIG. 2, when the fault detection 232 causes MOSFET 258 to shunt current to the LED 262 to ground, and the LED 262 may cease to receive any current. Thus, when a fault condition is detected, the fault detection circuit 232 in an embodiment may cause the LED 262 to turn off, indicating to a user that the power adaptor is malfunctioning, rather than the host information handling system 210. In such a way, embodiments of the present disclosure may avoid unnecessary returns or reformatting of correctly operating host information handling systems and related costs. The process may then end.

The blocks of the flow diagrams of FIGS. 4-6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A power adapter system comprising:
   a power source supplying a power source input voltage to a power source identification (PSID) module;
   the PSID module to convert the power source input voltage to a host power connection voltage for an operably connected host information handling system;
   the PSID module of the power adapter to receive an adjustable setting voltage from the power source based on the power connection host voltage that is dependent on the power source input voltage received via a setting voltage port of the PSID module; and a controller of the PSID module executing code instructions to:

select a PSID data record for a power source identified by the adjustable setting voltage received that is dependent on the power source input voltage and select a dynamic power rating from a plurality of dynamic power ratings for the power source, where the PSID module has a plurality of PSID data records associated with a plurality of adjustable setting voltages for candidate power sources and the dynamic power rating associated with the identified power source is based on a measurement of the adjustable setting voltage indicating an operating condition of the power adapter and based on an indication of an operating condition of the operably connected host information handling system, wherein the dynamic power rating is one of a plurality of dynamic power ratings including an adjustable range of power levels at each dynamic power rating available for selection by the PSID module at which the power source is capable of operating; and a voltage line for providing input power according to a selected dynamic power rating to a power supply unit on the host information handling system.

2. The power adapter system of claim 1, wherein the operating condition of the power adapter that forms the basis of the selection of the power rating for the power source is a measured temperature of an internal component of the power adapter system.

3. The power adapter system of claim 1 further comprising:

a thermal sensor to measure a temperature of an internal component of the power adapter system and to adjust, via an electronic switch, the adjustable setting voltage based on the temperature of the internal component, wherein the temperature of the internal component is the operating condition of the power adapter system that forms the basis of the selection of the dynamic power rating.

4. The power adapter system of claim 3, wherein the temperature sensor is a thermistor.

5. The power adapter system of claim 1 further comprising:

the controller to determine the operating condition of the operably connected host information handling system based on receipt of an override signal from the operably connected host information handling system via a data line between the power adapter system and the information handling system, wherein the controller receives the override signal when the host information handling system has been receiving the host power connection voltage at a peak power level within the adjustable range of power levels of selected dynamic power rating for a preset maximum duration of time; and the controller selecting a default power level from the adjustable range of power levels of the selected dynamic power rating.

6. The power adapter system of claim 1 further comprising:

the controller transmitting a reset instruction to the operably connected host information handling system upon a startup event of the host information handling system;

the controller determining the operating condition of the operably connected host information handling system is capable of accepting peak power at startup based on receipt of a reply to the reset instruction from the operably connected host information handling system; and the controller selecting a peak power level from the adjustable range of power levels of the selected dynamic power rating.

7. The power adapter system of claim 1 further comprising:

a light emitting diode of the power adapter system receiving current from the power source and emitting light;

a fault detection circuit of the PSID module determining a fault condition has occurred; and the fault detection circuit interrupting the flow of current to the light emitting diode such that the light emitting diode discontinues emitting light via an electronic switch upon detection of the fault condition.

8. A method of determining a dynamic power source identification (PSID) for a power adapter comprising:

supplying a host power connection voltage according to a selected dynamic power rating for a detected power source its power source voltage at a power adapter for an operably connected host information handling system via a voltage line providing the host power connection voltage according to the selected dynamic power rating to a power supply unit on the host information handling system, where the selected dynamic power rating is selected from a plurality of dynamic power ratings determined for the detected power source based on the power source voltage determined for the detected power source and identified from a plurality of candidate coupled power sources as determined by an adjustable set voltage by a PSID module;

measuring the adjustable setting voltage at a setting voltage pin of the PSID module that is dependent upon the power source voltage received from the detected power source as converted to the host power connection voltage, wherein the value of the adjustable setting voltage is further dependent upon a measured internal temperature of a power adapter component to electronically switch a voltage divider of the host power connection voltage to set the adjustable setting voltage; and identifying, via a controller, the dynamic power rating for the detected power source and the power adapter based on a measurement of the adjustable setting voltage and identifying the dynamic power rating further based on an operating condition of the operably connected host information handling system, wherein the dynamic power rating is one of a plurality of power ratings each with an adjustable range of power levels at which the power adapter is capable of operating to supply the host power connection voltage on the voltage line.

9. The method of claim 8 further comprising:

controlling the adjustable setting voltage based on the temperature of the internal component via a thermal sensor controlled electronic switch to adjust an adjustable voltage divider via a plurality of resistors.

10. The method of claim 9, wherein the electronic switch is a metal-oxide substrate field effect transistor (MOSFET).

11. The method of claim 8 further comprising:

receiving an override signal from the host information handling system indicating that the host information handling system has been receiving the host power connection voltage at a peak power level for a preset maximum duration of time as the operating condition of the operably connected host information handling system; and selecting a default power level from the adjustable range of power levels of the identified dynamic power rating.

12. The method of claim 8 further comprising:

transmitting a reset instruction to the operably connected host information handling system, via the controller, upon a startup event of the host information handling system;

determining the capability of accepting peak power at startup as the operating condition of the operably connected host information handling system based on a receipt of a reply to the reset instruction from the operably connected host information handling system; and selecting a peak power level from the adjustable range of power levels of the identified dynamic power rating.

13. The method of claim 8 further comprising:

transmitting a reset instruction to the operably connected host information handling system, via the controller, upon a startup event of the host information handling system; and determining the capability of accepting peak power at startup as the operating condition of the operably connected host information handling system based on a lack of receipt of a reply to the reset instruction from the operably connected host information handling system; and selecting a default power from the adjustable range of power levels of the identified dynamic power rating.

14. The method of claim 8 further comprising:

emitting light from a light emitting diode receiving current from the power source voltage;

determining a fault condition has occurred via a fault detection circuit of the PSID module; and interrupting the flow of current to the light emitting diode, via the fault detection circuit pulling a fault pin low, such that the light emitting diode discontinues emitting light.

15. A power adapter system comprising:

a power source supplying a power source input voltage to a power source identification (PSID) module;

the PSID module to convert the power source input voltage to a host power connection voltage for an operably connected host information handling system to the power adapter system, where the host power connection voltage is used to determine an adjustable setting voltage to be input into the PSID module for a detected power source selected from a plurality of potentially coupled power sources to the power adapter system;

a controller executing the PSID module of the power adapter system receiving an adjustable setting voltage determined from the power source input voltage via a setting voltage port of the PSID module for selection of the dynamic power rating from a plurality of available dynamic power ratings for supplying host power connection voltage to the operably connected host information handling system and based on the adjustable setting voltage set in part by the power source and a detected power source voltage for the power source;

a voltage line for providing host power connection voltage according to the selected dynamic power rating and selected from a plurality of dynamic power ratings available at which the power adapter system is capable of operating to a power supply unit on the host information handling system for the detected power source voltage for the power source;

a light emitting diode of the power adapter receiving current from the power source and adapted to emit light during operation;

the controller including a fault detection circuit of the PSID module determining a fault condition has occurred based on the measurement of the setting; and the fault detection circuit interrupting the flow of current to the light emitting diode by pulling a fault pin low such that the light emitting diode discontinues emitting light during a fault condition.

16. The power adapter system of claim 15, wherein the fault detection circuit interrupts the flow of current to the light emitting diode by shunting current transmitted by the power source voltage to ground.

17. The power adapter system of claim 15, further comprising:

the controller of the PSID module to identify the dynamic power rating for the power adapter based on a measurement of the adjustable setting voltage derived from the power source input voltage converted to the host power connection voltage and a thermal sensor measuring a temperature of an internal component of the power adapter to thermally control an electronic switch for a voltage divider to adjust the adjustable setting voltage input to the controller PSID module based on the temperature of the internal component; and wherein the temperature of the internal component is the operating condition of the power adapter further forms a basis of the identification of selection of an adjustable range of power levels of the dynamic power rating.

18. The power adapter system of claim 15 further comprising:

the controller determining the operating condition of the operably connected host information handling system based on receipt of an override signal from the operably connected host information handling system, wherein the controller receives the override signal when the host information handling system has been receiving the host power connection voltage at a peak power rating for a preset maximum duration of time; and the controller selecting a default power level from an adjustable range of power levels of the dynamic power rating of the identified dynamic power rating.

19. The power adapter system of claim 15, wherein the fault condition is an over voltage event.

20. The power adapter system of claim 15, wherein the fault condition is an under voltage event.

* * * * *